Aug. 21, 1934.  P. E. ATTICK ET AL  1,970,683
STORE FRONT CONSTRUCTION
Filed July 5, 1932
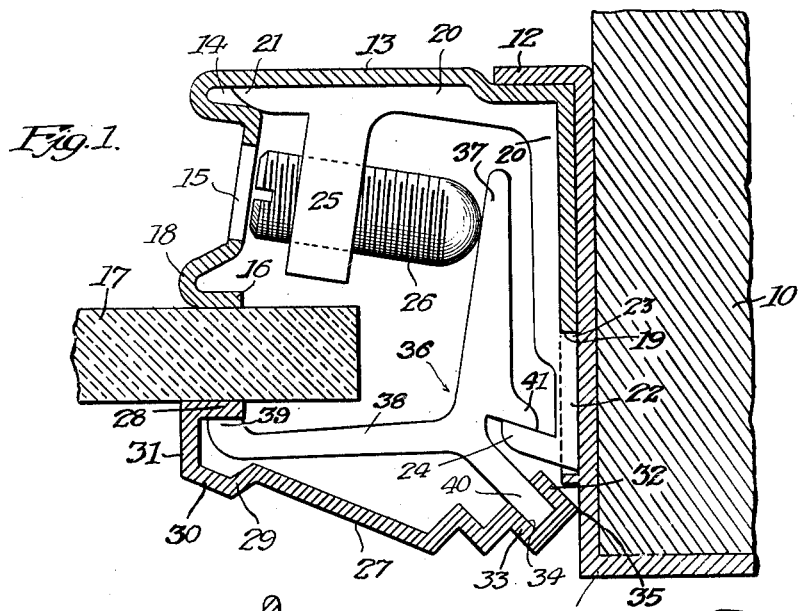
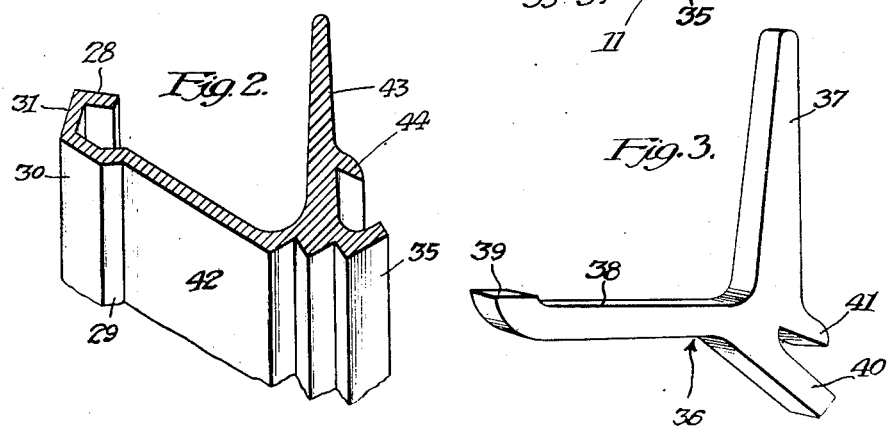
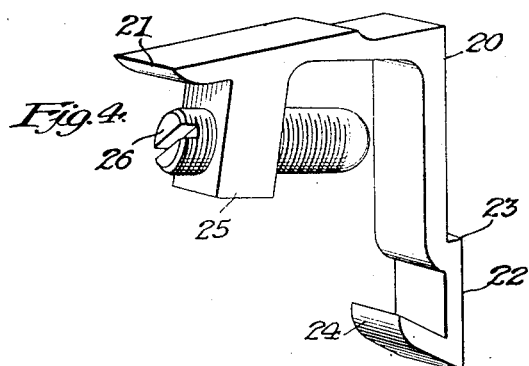
Inventors:
Purdy E. Attick and
John J. Bosshard Patented Aug. 21, 1934

1,970,683

UNITED STATES PATENT OFFICE 1,970,683

STORE FRONT CONSTRUCTION

Purdy E. Attick and John J. Bosshard, Chicago, Ill., assignors to Brasco Manufacturing Company, Harvey, Ill., a corporation of Illinois Application July 5, 1932, Serial No. 620,740

10 Claims. (Cl. 20—56.4)

Our invention relates to a store front construction and has particular reference to a construction in which a pair of glass pane engaging members is provided which are adapted to grip a glass pane along its edge and hold it in position in a store window or the like.

Another object of our invention is the provision of a store front construction in which the outer glass pane engaging member is pivotally positioned along its bottom edge upon the window frame or side of the window casing in such manner that a tight joint is formed, excluding water and the like at this portion of the frame, and also providing for a tight gripping action of the member in holding the glass pane.

Another and further object of our invention is the provision of a store front construction in which the outside anchoring members are placed in position in the outer glass pane engaging member in substantially fixed relation and in position to cooperate with an anchoring member mounted in the inner glass pane engaging member, the two anchoring members being interengaged to prevent the outer glass pane engaging member from moving outward, so that a tight and simple construction is thus formed.

Another and further object of our invention is the provision of a store front construction which is adaptable for the use of glass of varying thicknesses within the range of glass in common use for store fronts, that is, one size is capable of use for all ordinary purposes instead of being capable of use with only one thickness of glass which is a common fault of a large number of these constructions now in use.

Another and further object of our invention is the provision of a store front construction which is securely held together and in which the glass will not become loosened through vibration, wind pressure and the like.

These and other objects of our invention will be more fully and better understood by reference to the accompanying sheet of drawing, in which—

Figure 1 is a cross sectional view embodying our invention;

Figure 2 is a perspective view of a modified form of a section of the outside glass pane engaging member;

Figure 3 is a perspective view showing the lever which is mounted in the outside glass pane engaging member; and Figure 4 is a perspective view of the anchoring member mounted within the inner glass pane engaging member.

Referring now specifically to the drawing, in which like reference characters refer to like parts throughout, a window frame 10 is shown having a casing member 11 mounted thereover, the casing member having an inturned portion 12 at its rear thereof. An inner glass pane engaging member 13 is provided which seats against the member 11 and is secured thereto in any approved manner. The member 13 also rests against the upturned portion 12 of the member 11 thus forming a support for the member 13 at its back for a partial distance along its side. The member 13 is turned inward on its inner edge in such manner that a channel 14 is formed adjacent its outer wall on the inside of the member 13, with an opening 15 extending through its wall, and its inner edge 16 being turned downward to engage against the inner side of a glass pane 17. The inner portion of the member 13 is bent at 18 and forms, with the portion surrounding the channel 14, cushioning means for gripping the glass pane 17 and in effect an elastic mounting for the glass pane and assists in cushioning wind shocks and the like.

An opening 19 is provided in the portion of the member 13 which seats against the member 11 adjacent the forward edge thereof, into which a portion of an anchoring member 20 seats (Fig. 4) and which is fitted into the member 13 and has its outer surface of such contour that it conforms to the contour of the inner surface of the member 13. An upper portion 21 of the member 20 is provided which fits into the channel 14. A projecting portion 22 having a shoulder 23 thereon fits into the recess 19 formed in the member 13. The outer end 24 of the member 20 is upturned to form a hook which engages a projection formed upon a lever, hereinafter described, for holding the lever in the assembled position. The anchoring member 20 has an inwardly projecting lug portion 25 within which a screw 26 is positioned for the purpose of operatively engaging the lever, hereinafter described, in the assembled construction. The lug portion 25 is formed at a slight angle and the screw 26 inserted therethrough at a right angle to the longitudinal plane of the lug. The force of the lever against the point of the screw 26 is in a straight line, thereby causing the screw to bind in the lug 25 and holding the screw against backing or becoming loosened by vibration.

An outer glass pane engaging member 27 is provided having an inwardly turned end 28 adapted to engage the outer surface of the glass pane 17, and has a bead portion formed thereon about a diagonally outwardly extending wall portion 29, a further diagonally extending portion 30, and a straight portion 31 connecting with the inturned portion 28. The lower marginal edge of the member 27 is stepped with the portions thereof extending at approximately right angles to each other and having an inwardly turned end portion 32 which is parallel with one of the stepped portions 33. A channel 34 is formed therein and a pivot point 35 is provided for the member 27 against the casing member 12.

A lever designated as a whole as 36 is provided which consists essentially of three portions, a free end portion 37 adapted to be positioned under the screw 26, an upstanding portion 38 adapted to engage against the inner side of the end portion 28 of the member 27, and a projecting portion 40. The end 39 of the lever 36 is flat so as to engage against the inwardly turned portion 38 of the member 27. The projecting portion 40 is located substantially at the apex of the lever 36 and extends into the channel 34 formed between the portions 33 and 35 of the member 27, and is anchored in this channel against easy displacement and forms with the point 35 a rocking point upon which the lever 36 pivots. A projection 41 is formed on the lever 36 for engagement with the hook 24 on the anchoring member 20, which prevents the lateral movement of the member 36 and holds the device substantially in position. With the normal variation in thickness of store front glass the pivotal point of the lever is always about the pivot point 35 so that the pivotal point of the member 27 at 35 is held tightly in position against this member and forms a tight joint between these two members.

In Figure 2 a modified form of inter-sash engaging member 42 is shown having a portion 43 extending inwardly from the bottom thereof, with a projecting portion 44 on the under side thereof which is adapted to engage the hook 24 on the member 20. The end of the member 43 is engaged by the screw 26 as it is turned into the member 25, thereby tilting the member 42 inward and clamping the glass pane 17 against the inside member 13.

In formation the members 13 and 27 may be rolled or of the extruded design, and have the anchoring members 20 fitted therein so that they will not need to be moved by the workmen in setting a glass pane. The member 27 has the lever 36 placed therein in such position that the end 37 of the lever is under the screw 26 when the construction is placed in a store front so that in assembling the structure it is necessary to place the pane of glass 17 against the member 13 and the member 27 is thereupon fitted against the outer section of the glass pane and the screws 26 tightened. This brings the portion 28 of the member 27 up against the glass pane 17 and tightly clamps the glass pane between the portion 16 of the member 13 and the portion 28 of the member 27.

We have found in practice that as the screw 26 is tightened the downward force of the screw exerted upon the lever forces the lever downward and with it the outer pane engaging member, and then the lever with the pane engaging member rocks inward, gripping the glass pane tightly, but providing a tight joint between the outer pane engaging member and the window casing.

It is understood of course that the members 13 and 27 are made in suitable lengths to fit a variety of sizes of windows, with the anchoring members spaced therein a suitable distance to provide a store front construction of adequate strength to hold the glass pane 17 in position.

In the modified form as illustrated in Figure 2, the lever as a separate element is dispensed with and a portion fashioned integrally with the outer pane, but the operation of the structure is substantially the same as when the lever is employed as a separate element.

While we have described more or less precisely the details of construction, we do not wish to be understood as limiting ourselves thereto, as we contemplate changes in form and the proportion of parts and the substitution of equivalents as circumstances may suggest or render expedient without departing from the spirit or scope of our invention.

We claim:

1. A store front construction, comprising in combination a fixed inner glass pane engaging member, a movable outer glass pane engaging member having a channel formed therein, a lever having a projecting pivotal portion thereon adapted to be received in the channel in said outer glass pane engaging member and having a lug thereon, an anchoring member fixed in said inner member having a projection thereon adapted to engage the lug on said lever, a screw in said last mentioned member adapted to engage one end of the said lever whereby the glass pane is clamped between the glass pane engaging members.

2. A store front construction, comprising in combination, a fixed inner glass pane engaging member, a movable outer glass pane engaging member, a lever fixed in said outer member and having projecting portions on the outer side thereof one of said projecting portions forming the pivotal point for the movement of the said lever, an anchoring member fixed in said inner member having a projection thereon adapted to engage one of said projecting portions on said lever, a screw in said last mentioned member adapted to engage one end of the said lever whereby the glass pane is clamped between the glass pane engaging members.

3. A store front construction, comprising in combination, a fixed inner glass pane engaging member, an anchoring member having a projecting end portion mounted therein, an outer movable glass pane engaging member having channels along each of its marginal edges, a lever having portions thereof in said channels and having a projection thereon adapted to engage said anchoring member, and means whereby the said lever is actuated.

4. A store front construction, comprising in combination, a fixed inner glass pane engaging member, an anchoring member having a projecting end portion mounted therein, an outer movable glass pane engaging member having a channel formed along its base, a lever having portions thereof in said channel and having a projection thereon adapted to engage said anchoring member, and means whereby the said lever is actuated.

5. A store front construction, comprising in combination, a fixed inner glass pane engaging member, an anchoring member having a projecting end portion mounted therein, an outer movable glass pane engaging member having channels along each of its marginal edges, a lever having a projecting portion at the outer side thereof adapted to project into one of said channels, one end of said lever projecting into the other channel, and having a projection thereon adapted to engage said anchoring member, and means whereby the said lever is actuated.

6. A store front construction, comprising in combination, a fixed inner glass pane engaging member, an anchoring member having a projecting end portion mounted therein, an outer movable glass pane engaging member having channels along each of its marginal edges having a plurality of angular base portions, a lever having portions thereof in said channels and having a projection thereon adapted to engage said anchoring member, and means whereby the said lever is actuated.

7. A store front construction, comprising in combination, a fixed inner glass pane engaging member, an anchoring member having a projecting end portion mounted therein, an outer movable glass pane engaging member having channels along each of its marginal edges having a base portion formed of portions extending at right angles to each other, a lever having portions thereof in said channels and having a projection thereon adapted to engage said anchoring member, and means whereby the said lever is actuated.

8. A store front construction, comprising in combination, a fixed inner glass pane engaging member, a movable outer glass pane engaging member, a lever fixed in said outer member and having projecting portions on the outer side thereof, an anchoring member fixed in said inner member having a projection thereon adapted to engage one of said projecting portions on said lever, a screw in said last mentioned member adapted to engage one end of the said lever whereby the glass pane is clamped between the glass pane engaging members, the said screw being angularly positioned with respect to the said lever the longitudinal axis of the said screw being in alignment with the engaging surfaces of the lug on the anchoring member and the projecting portion of the lever.

9. A store front construction, comprising in combination, a fixed inner glass pane engaging member, a movable outer glass pane engaging member, a lever fixed in said outer glass pane engaging member having projecting portions on the outer side thereof, one of said projecting portions engaging said outer glass pane engaging member at its lower side, an anchoring member mounted in said inner glass pane engaging member having a hook thereon and an angularly positioned lug, a screw in said angularly positioned lug adapted to engage one end of the said lever.

10. A store front construction, comprising in combination, a fixed inner glass pane engaging member, a movable outer glass pane engaging member, a pivotally mounted lever having projections on its outer side, one of said projections being longer than the other, an anchoring member in said fixed glass pane engaging member having a projection thereon adapted to cooperate with the shorter of the two projections on said lever, the longer of the two projections engaging the outer sash engaging member adjacent its outer marginal edge, and a screw in said anchoring member adapted to engage one end of said lever.

PURDY E. ATTICK.
JOHN J. BOSSHARD.